(12) United States Patent
Liu et al.

(10) Patent No.: US 8,194,055 B2
(45) Date of Patent: Jun. 5, 2012

(54) STYLUS RETAINING MECHANISM FOR PORTABLE ELECTRONIC DEVICE

(75) Inventors: Jing-Hua Liu, Shenzhen (CN); Yong-Gang Zhang, Shenzhen (CN); Kuan-Hung Chen, Shindian (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/890,736

(22) Filed: Sep. 27, 2010

(65) Prior Publication Data

US 2012/0018336 A1 Jan. 26, 2012

(30) Foreign Application Priority Data

Jul. 22, 2010 (CN) .......................... 2010 1 0233907

(51) Int. Cl.
*B65D 85/00* (2006.01)
(52) U.S. Cl. .................................. 345/179; 361/679.26
(58) Field of Classification Search .................. 206/320, 206/315.1, 249, 252, 255; 220/708; 462/79; 446/1, 86, 106; 463/43, 46, 1; 248/917; 312/9.19; 361/679.56, 614, 657, 679.58, 361/679.57; 345/179; 124/16, 26

See application file for complete search history.

(56) References Cited

U.S. PATENT DOCUMENTS

| | | | | |
|---|---|---|---|---|
| 5,664,551 A | * | 9/1997 | Spector | 124/16 |
| 6,129,430 A | * | 10/2000 | Wu | 312/223.1 |
| 6,518,926 B2 | * | 2/2003 | Hulick et al. | 343/702 |
| 7,319,460 B2 | * | 1/2008 | Lee | 345/179 |
| 2001/0014010 A1 | * | 8/2001 | Jenks et al. | 361/686 |
| 2003/0184529 A1 | * | 10/2003 | Chien | 345/179 |
| 2009/0246608 A1 | * | 10/2009 | Wu et al. | 429/100 |

* cited by examiner

*Primary Examiner* — Mickey Yu
*Assistant Examiner* — Rafael Ortiz
(74) *Attorney, Agent, or Firm* — Altis Law Group, Inc.

(57) ABSTRACT

A stylus retaining mechanism is configured for retaining a stylus. The stylus defines a cavity. The main body defines a receiving chamber to receive the stylus and a through hole above the receiving chamber. An elastic member is positioned at one end of the receiving chamber. A button assembly is attached in the cavity of the stylus. The button assembly includes a spring abutting the button. The through hole allows the button to partially extend through. The elastic member is compressed and abuts the stylus when the stylus is received in the receiving chamber.

17 Claims, 4 Drawing Sheets

STYLUS RETAINING MECHANISM FOR PORTABLE ELECTRONIC DEVICE

BACKGROUND

1. Technical Field

The exemplary disclosure generally relates to a stylus retaining mechanism, and, particularly, to a stylus retaining mechanism used in a portable electronic device.

2. Description of Related Art

Many portable electronic devices, such as palmtop computers, hand-held computers, laptop computers, mobile phones and personal digital assistants (PDAs), include a stylus or a touch pen. This can be utilized to input information into the electronic device, to select menu options or otherwise navigate through a touch control graphical user interfaces of an operating system or the current software. Generally, the stylus is stored inside a housing of the portable electronic device. A stylus retaining mechanism is used to retain the stylus. A conventional stylus retaining mechanism includes a hook to lock the stylus. However, the stylus is easy to be tightly locked by the hook but it is hard to take out.

Therefore, there is chamber for improvement within the art.

BRIEF DESCRIPTION OF THE DRAWINGS

Many aspects of the stylus retaining mechanism can be better understood with reference to the following drawings. The components in the drawings are not necessarily drawn to scale, the emphasis instead being placed upon clearly illustrating the principles of the stylus retaining mechanism.

DETAILED DESCRIPTION

Figure 1:
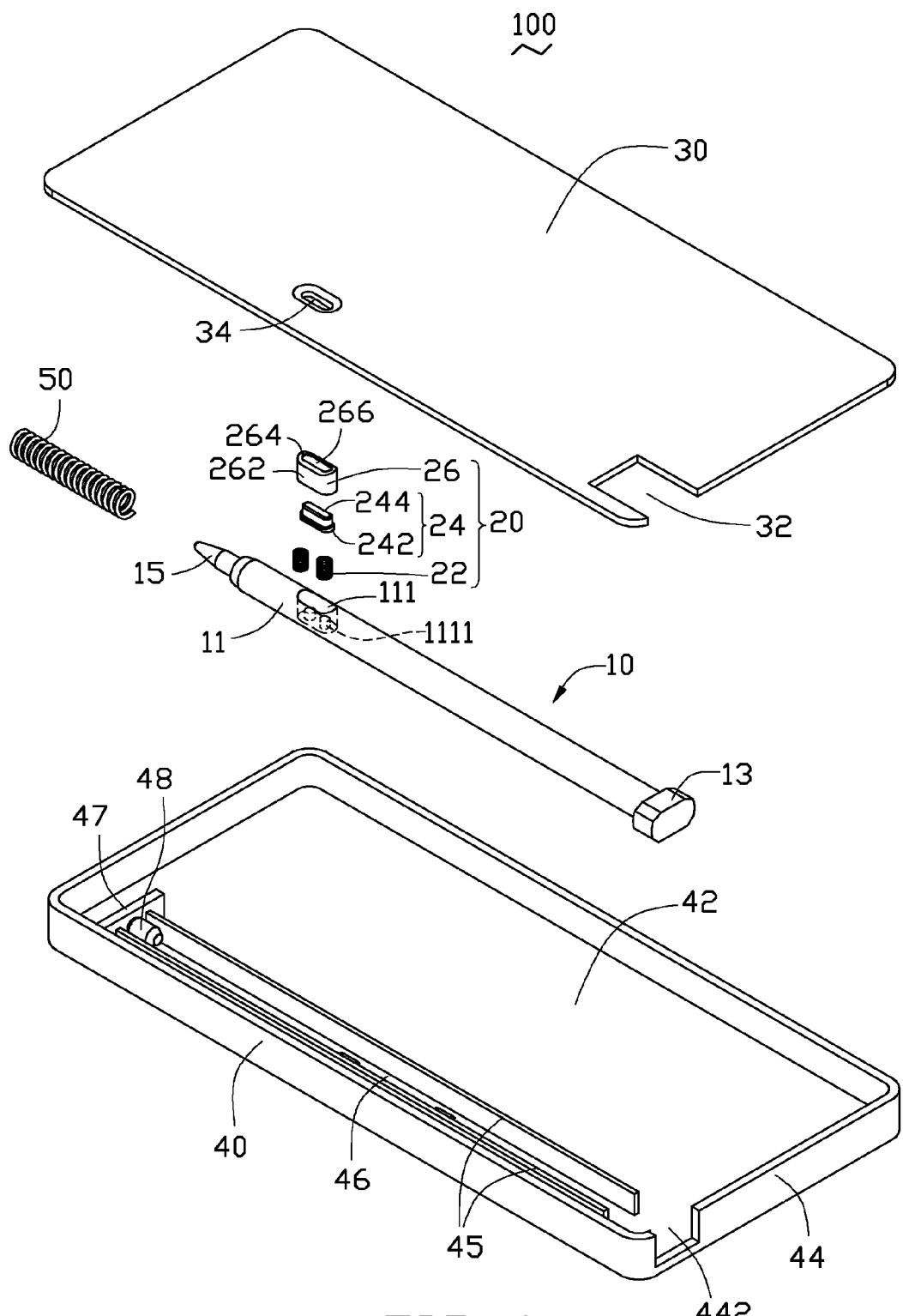
FIG. 1 is an exploded, isometric view of a stylus retaining mechanism with a stylus, in accordance with an exemplary embodiment.

FIG. 1 shows an exemplary embodiment of a stylus retaining mechanism 100 applied to a portable electronic device (not labeled) for retaining a stylus 10.

The stylus 10 includes a head portion 13, an end portion 15 and a body portion 11 connecting the head portion 13 and the end portion 15. The body portion 11 defines a cavity 111. Two spaced posts 1111 are formed in the cavity 111.

The stylus retaining mechanism 100 includes a button assembly 20, a cover 30, a housing 40, and an elastic member 50. The button assembly 20 is engaged in the cavity 111 of the stylus 10, and includes two springs 22, a button 24 and a holder 26. The button 24 includes a main portion 244 and a flange 242 around the main portion 244.

The holder 26 defines a receiving chamber 263 (shown in FIG. 3) for receiving the springs 22 and the button 24. The holder 26 is sized to fit into the cavity 111 of the stylus 10. A rim 264 is formed at one end of the holder 26, and defines an opening 266 communicating to the receiving chamber 263 to allow the main portion 244 of the button 24 to extend through. The rim 264 is configured for preventing the button 24 from separating from the holder 26. In this exemplary embodiment, the receiving chamber 263 is surrounded by an annular sidewall 262. However, it should be understood that the sidewall 262 can be any shape, not only annular. Also, the sidewall 262 can be divided into two or more parts.

To attach the button assembly 20 to the cavity 111 of the stylus 10, one end of each spring 22 is mounted on a corresponding post 1111, the other end abutting against the button 24. The holder 26 is inserted into the cavity 111 and is mounted on the button 24 and the springs 22. The holder 26 is fixed in the cavity 111 by adhesive or other means. The main portion 244 extends through the opening 266.

The cover 30 defines a cutout 32 at one end thereof and a through hole 34 at one side thereof. The through hole 34 allows the main portion 244 to extend through. A protrusion 36 (shown in FIG. 3) is formed between the cutout 32 and the through hole 34.

The housing 40 includes a bottom plate 42 and an end wall 44. Two substantially parallel bars 45 are formed at one side of the bottom plate 42. The two bars 45 defines a space 46 therebetween. A connecting board 47 away from the end wall 44 connects the two bars 45 at one end. A column 48 extends from the connecting board 47 between the two bars 45. The end wall 44 defines a notch 442 corresponding to the cutout 32 of the cover 30. The notch 442 is aligned with the space 46.

The elastic member 50 is a spring. One end of the elastic member 50 is mounted on the column 48.

When the cover 30 is attached to the housing 40, the bottom plate 42, the two bars 45, the connecting board 47 and the cover 30 cooperatively define a receiving chamber 46 for receiving the stylus 10. The through hole 34 and the protrusion 36 are positioned above the space 46 between the bars 45. The notch 442 and the cutout 32 allow the stylus 10 to be inserted into the receiving chamber 46.

Figure 2:
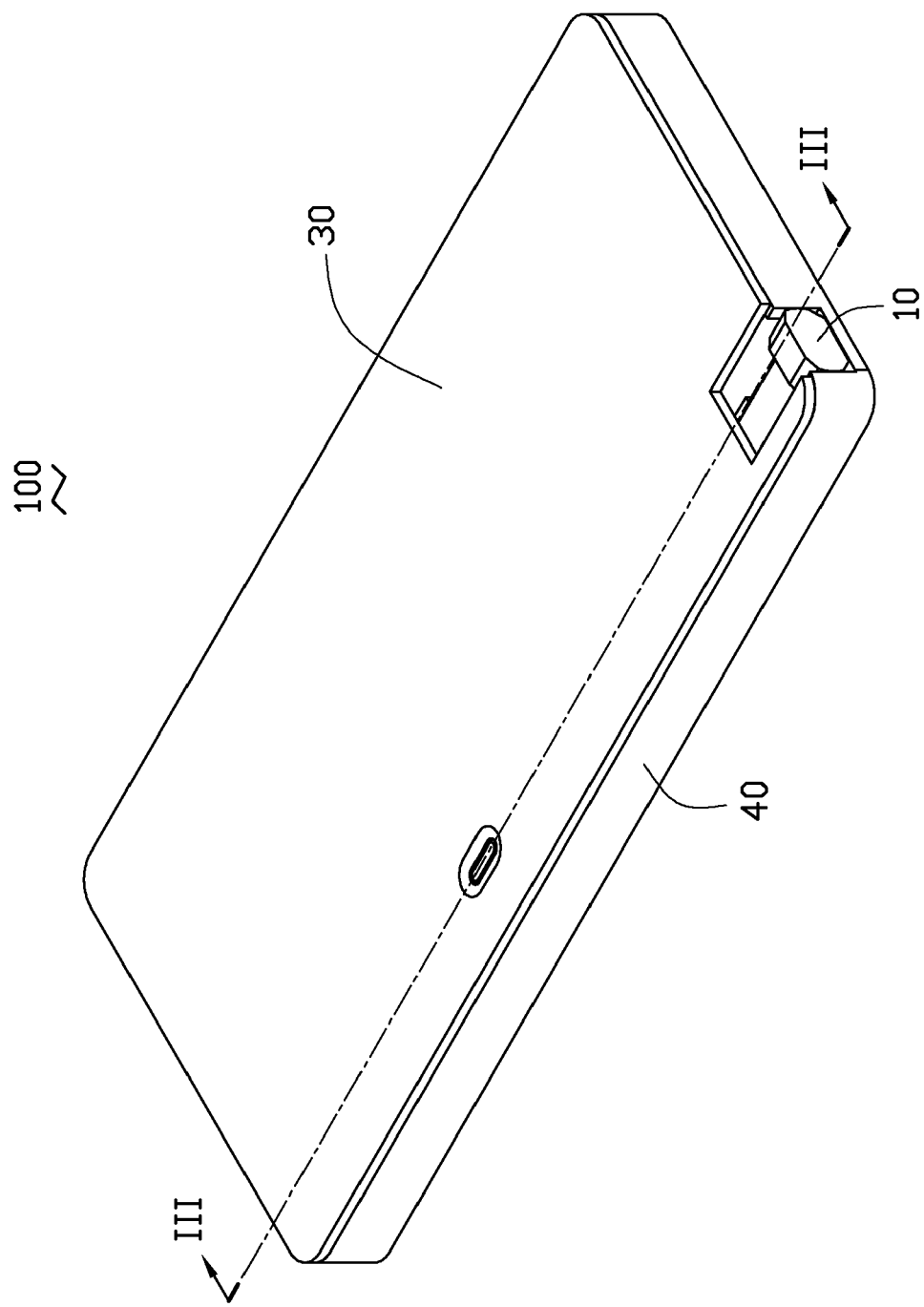
FIG. 2 is an assembled, isometric view of the stylus retaining mechanism shown in FIG. 1.
Figure 3:
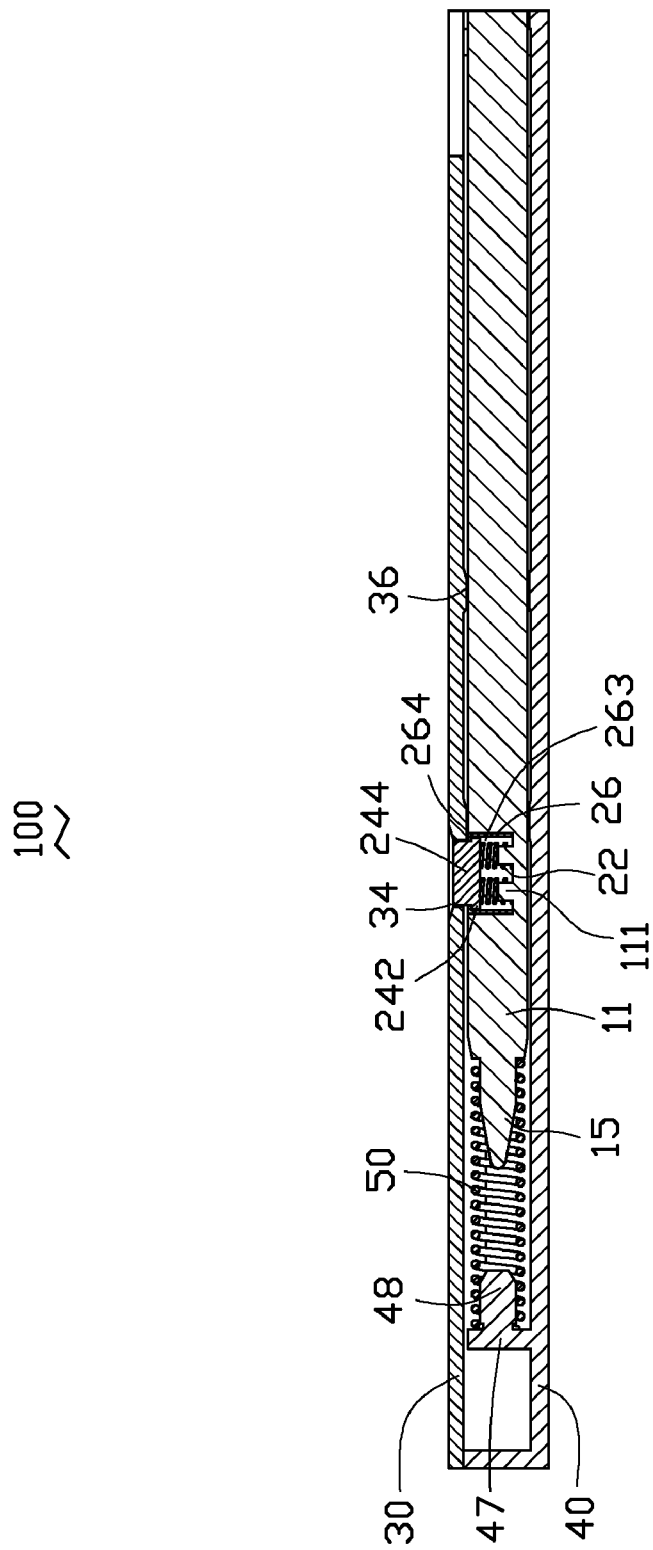
FIG. 3 is a cross-sectional view of the stylus retaining mechanism along line III-III of FIG. 2.
Figure 4:
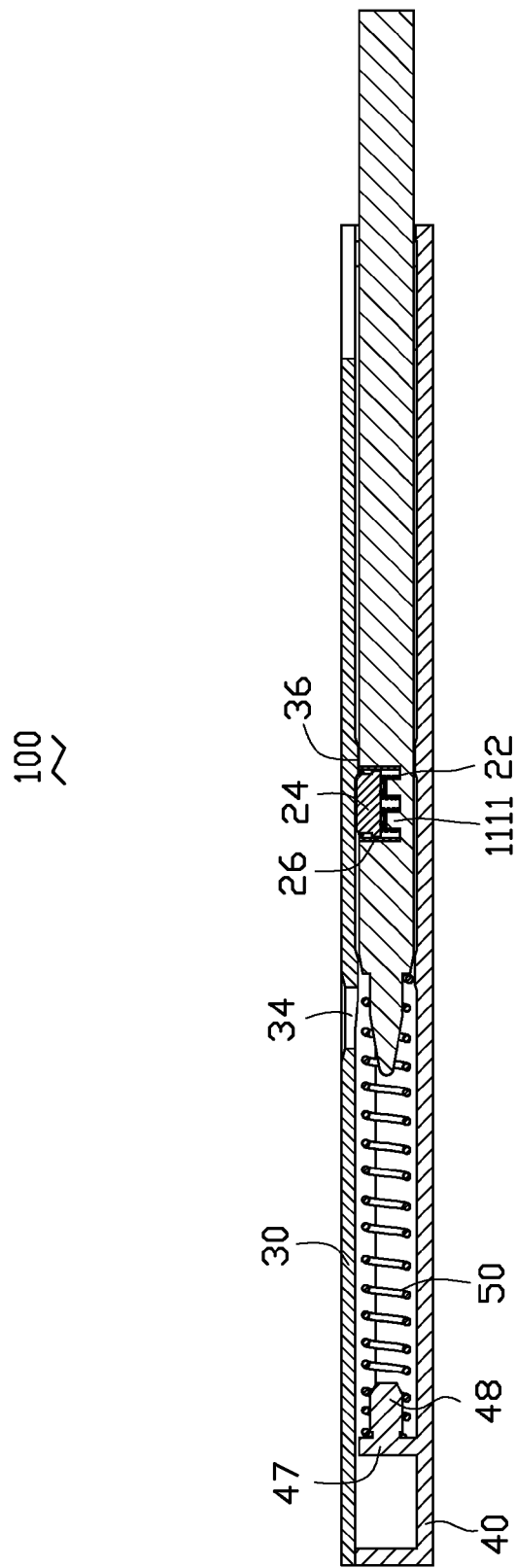
FIG. 4 is similar to FIG. 3, but showing that the stylus is pushed out by an ejection assembly of the stylus retaining mechanism.

To attach the stylus 10 to the stylus retaining mechanism 100, referring to FIGS. 2-4, the end portion 15 is inserted into the receiving chamber 46 via the notch 442. The button 24 abuts the cover 30 while the springs 22 are compressed. The stylus 10 is further moved into the receiving chamber 46 and passes the protrusion 36. The end portion 15 of the stylus 10 then abuts the elastic member 50. At the same time, the elastic member 50 is compressed. The stylus 10 is stopped moving when the button 24 reaches the through hole 34. The springs 22 rebound to their original shapes, pushing the button 24 to extend through the through hole 34. Thus, the stylus 10 is locked in the receiving chamber 46.

To detach the stylus 10 from the stylus retaining mechanism 100, the button 31 is depressed, and the springs 22 are compressed at the same time. The stylus 10 is ejected by a rebounding force of the compressed elastic member 50. It should be understood that the protrusion 36 can prevent the stylus 10 from being wholly pushed out. Since the head portion 13 is pushed out from the notch 442, it is easy to detach the stylus 10 from the receiving chamber 46 via the head portion 13. When the stylus 10 is moved out from the receiving chamber 46, the button 24 returns to an original position by a rebounding force of the springs 22.

It is to be understood that the number of the springs 22 may be reduced to be only one, and the number of the posts 1111 is accordingly changed.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stylus retaining mechanism comprising:
a stylus including a tip end and defining a cavity, two parallel posts formed in the cavity;
a main body defining a stylus receiving chamber and a through hole above the stylus receiving chamber;
an elastic member positioned at one end of the stylus receiving chamber and one end of the elastic member placed around the tip end of the stylus; and
a button assembly attached in the cavity of the stylus and partially received in the through hole, the button assembly including a button for direct contact by a user, two springs, the springs respectively placed around the posts, and abutting against the button, whereby pressing of the button by the user causes the button assembly to release the latching of the stylus in the receiving chamber, and the elastic member providing a force to push the stylus from the stylus receiving chamber, wherein the button assembly further includes a holder received in the cavity, the holder is mounted on the springs and the button, and the holder defines an opening allowing the button to partially extend through.

2. The stylus retaining mechanism as claimed in claim 1, wherein the holder comprises a sidewall and a rim at one end of the sidewall, and the opening is defined by the rim.

3. The stylus retaining mechanism as claimed in claim 1, wherein the button comprises a main portion and a flange around the main portion, the opening allows the main portion to extend through, and the rim prevents the button from separating from the holder.

4. The stylus retaining mechanism as claimed in claim 1, wherein the main body comprises a connecting board at one end of the stylus receiving chamber, and another end of the elastic member abuts the connecting board.

5. The stylus retaining mechanism as claimed in claim 4, wherein the elastic member is a spring, a column extends from the connecting board and is coaxial with the stylus, and another end of the elastic member is mounted on the column.

6. The stylus retaining mechanism as claimed in claim 5, wherein the main body comprises a housing and a cover, the cover covers the stylus receiving chamber of the housing, the through hole is defined in the cover, the housing includes a bottom plate, and the connecting board is formed on the bottom plate.

7. The stylus retaining mechanism as claimed in claim 6, wherein two substantially parallel bars are formed on the bottom plate, and the stylus receiving chamber is defined by the bottom plate, the bars, the connecting board and the cover.

8. The stylus retaining mechanism as claimed in claim 7, wherein the housing defines a notch communicating to the stylus receiving chamber at one end, and the cover defines a cutout corresponding to the notch of the housing.

9. A portable electronic device comprising:
a stylus including a tip end and defining a cavity, two parallel posts formed in the cavity;
a main body defining a stylus receiving chamber to receive the stylus and a through hole above the stylus receiving chamber;
an elastic member fixed at one end of the stylus receiving chamber, one end of the elastic member placed around the tip end of the stylus; and
a button assembly attached in the cavity of the stylus, the button assembly including two springs and a button, the springs respectively placed around the posts and abutting the button, the stylus locked in the stylus receiving chamber by engagement between the button and the through hole, and the elastic member pushing the stylus out from the stylus receiving chamber when the button is depressed, wherein the button assembly further includes a holder received in the cavity, the holder is mounted on the springs and the button, and the holder defines an opening allowing the button to partially extend through.

10. The portable electronic device as claimed in claim 9, wherein the holder comprises a sidewall and a rim at one end of the sidewall, and the opening is defined by the rim.

11. The portable electronic device as claimed in claim 9, wherein the button includes a main portion and a flange around the main portion, the opening allows the main portion to extend through, and the rim prevents the button from separating from the holder.

12. The portable electronic device as claimed in claim 11, wherein the main body comprises a connecting board at one end of the stylus receiving chamber, and another end of the elastic member abuts the connecting board.

13. The portable electronic device as claimed in claim 12, wherein the elastic member is a spring, a column extends from the connecting board and is coaxial with the stylus, and one end of the spring is mounted on the column.

14. The portable electronic device as claimed in claim 13, wherein the main body comprises a housing and a cover, the cover covers the stylus receiving chamber of the housing, the through hole is defined in the cover, the housing includes a bottom plate, and the connecting board is formed on the bottom plate.

15. The portable electronic device as claimed in claim 14, wherein two substantially parallel bars are formed on the bottom plate, and the stylus receiving chamber is defined by the bottom plate, the bars, the connecting board and the cover.

16. The portable electronic device as claimed in claim 15, wherein the housing defines a notch communicating to the stylus receiving chamber at one end, and the cover defines a cutout corresponding to the notch of the housing.

17. The portable electronic device as claimed in claim 9, wherein the main body comprises a protrusion in the stylus receiving chamber adjacent to the through hole.

* * * * *